United States Patent [19]

Hofmann

[11] Patent Number: 5,031,491
[45] Date of Patent: Jul. 16, 1991

[54] TOOL DEVICE

[75] Inventor: Heinz-Wilhelm Hofmann, Bellheim, Fed. Rep. of Germany

[73] Assignee: Maag Gear-Wheel & Machine Company Limited, Zurich, Switzerland

[21] Appl. No.: 532,868

[22] Filed: Jun. 4, 1990

[30] Foreign Application Priority Data

Jun. 29, 1989 [CH] Switzerland ............ 2414/89

[51] Int. Cl.$^5$ ............................................. B23B 29/00
[52] U.S. Cl. .................................... 82/158; 407/71; 407/87; 407/93; 407/104; 407/106
[58] Field of Search ............... 407/119, 66, 67, 68, 407/69, 70, 71, 73, 76, 85, 86, 87, 88, 93, 101, 102, 103, 104, 106, 117; 82/158, 138

[56] References Cited

U.S. PATENT DOCUMENTS

| 3,623,201 | 11/1971 | Gustafson | 407/104 |
| 3,760,475 | 9/1973 | Gleason | 407/104 |
| 4,397,592 | 8/1983 | Erickson | 407/104 |
| 4,430,031 | 2/1984 | Hellström | 407/104 |
| 4,708,037 | 11/1987 | Buljan et al. | 407/119 |
| 4,714,384 | 12/1987 | Lagerberg | 407/104 |
| 4,722,642 | 2/1988 | Musacchia, Jr. | 407/104 |
| 4,938,110 | 7/1990 | Ruby | 407/71 |

Primary Examiner—Frederick R. Schmidt
Assistant Examiner—Blynn Shideler
Attorney, Agent, or Firm—Bachman & LaPointe

[57] ABSTRACT

A tool device has a toolholder and a profile tool detachably secured to this, both of which comprise stops cooperating with one another for the precise positioning of the cutting profile of the profile tool relative to the toolholder which can be mounted on a machine tool, the stops being constructed in the form of mating surfaces. At least one adjusting element is provided between the toolholder and the profile tool to bring the profile tool to bear on the mating surfaces on the toolholder.

12 Claims, 8 Drawing Sheets

TOOL DEVICE

BACKGROUND OF THE INVENTION

The invention relates to a tool device in which a profile tool is detachably secured to a toolholder.

Such a tool device, with stops on the toolholder and tool for positioning the cutting profile of the tool relative to the holder, is the subject of EP A-0 132350. The profile tool shown there is annular in construction and comprises teeth at its outer circumference. The toolholder comprises an annular body on which the profile tool is seated and is locked through an annular bush, by means of a nut. In the course of this, the inner edge of the profile tool comes to bear against an annular shoulder of the bush. In order to ensure a precisely centric arrangement of the profile tool on the toolholder, there must be a relatively tight fit between the inner edge of the profile tool and the annular shoulder of the bush, but this is not guaranteed in the case in question because the profile tool in the clamped state is deformed in the shape of the rim of a plate.

In order to ensure accurate positioning of the profile tool in the circumferential direction, the bush has a bore which runs substantially parallel to its axis and extends into the annular body, which bore intersects the inner edge of the profile tool which has a recess at this inner edge. The profile tool is arranged so that this recess is in alignment with the bore in which a pin is then inserted. If the recess at the inner edge of the profile tool is not precisely in alignment with the bore, there is the danger of the recess being deformed when the pin is inserted so that a satisfactory positioning of the profile tool in the circumferential direction is no longer guaranteed.

It is an object of the present invention to provide a simple means for ensuring a reproducible alignment of a profile tool on a toolholder.

SUMMARY OF THE INVENTION

In the tool device of the invention the profile tool is detachably secured to the toolholder by locking means with mating surfaces of the tool and toolholder positioning the cutting profile of the tool relative to the toolholder. At least one adjusting element extends between the toolholder and the tool to press the tool through at least one mating surface against at least one mating surface of the toolholder and so determine said positioning of the tool cutting profile.

The adjusting element may take the form of a screw element comprising a threaded portion and an eccentric portion. A screw thread in one of said tool and toolholder engages the threaded portion and an aperture in the other of said tool and toolholder engages the eccentric portion, such that rotation of the screw element presses said mating surfaces into engagement, whereupon said locking means can secure the tool with the mating surfaces in engagement with each other.

Further features and advantages of the invention will be apparent from the examples of embodiment of the invention explained in more detail below with reference to the drawings. The examples each relate to a rack-shaped cutter tool with associated toolholder, but it will be clear that the invention can be employed with cutter tools of varied forms.

DESCRIPTION OF THE PREFERRED EMBODIMENTS

The profile tool 1 according to FIGS. 1 to 4 and 9 to 12 comprises a toothed rack 2 and a flat rectangular main body 3. The lower face 4 of the body 3 lies on a face 5 of the toolholder 6,6A,6B,6C or 6D in each case. This body 3 and thereby the profile tool 1 are fixed to the toolholder 6 by two locking screws 7 in each case. These screws 7 extend with their shanks through bores in the body 3 which have a larger diameter than these shanks.

At the side remote from the toothed rim 2, the toolholder 6 to 6D has a recess 8 in each case, in which a rectangular or cubic adjusting block 9 is inserted and secured to the toolholder by means of a screw 10. The adjusting block 9 projects, with its upper surface, above the face 5.

At the side remote from the toothed rim 2, provided on the profile tool 1 at the rear edge 11 is a recess 12 into which the upwardly projecting portion of the adjusting block 9 fits with an accurate fit.

In the region between the toothed rack 2 and the adjusting block 9, an adjusting element in the form of an eccentric screw 13 is screwed into the toolholder 6 to 6D. Furthermore, the body 3 has an aperture or bore 14 whereby the body is slipped onto the eccentric 15 of the eccentric screw 13.

In the examples of embodiment illustrated, the eccentric assumes a position offset obliquely downwards and to the left in relation to the axis of the threaded bolt of the eccentric screw 13. In order to mount the profile tool 1 on the toolholder 6, the profile tool 1 is laid with its face 4 on the face 5, during which the eccentric 15 engages in the bore 14 and the adjusting block 9 engages in the recess 12. Then the locking screws 7 are loosely screwed in. If the eccentric screw 13 is now turned in counter-clockwise direction, the mating surfaces 16,17 of the recess 12 will be pressed against the mating surfaces 18,19 of the adjusting block 9. The pairs of mating surfaces 16,18 and 17,19 extend perpendicularly to each other and both pairs of surfaces extend substantially parallel to the direction of cutting stroke of the rack, ie. parallel to the longitudinal profile of the tool.

The locking screws 7 each have a right-hand thread so that they are turned in clockwise direction during the tightening. The torque transmitted through the screws heads to the body 3 by friction in the course of this presses together further the mating surfaces 16,18 of the recess 12 and of the adjusting block 9 respectively. Thus the mating surfaces 16,18 and 17,19 respectively are prevented from coming out of contact during the tightening of these screws 7.

Along the rear edge 11 of the body 3 of the profile tool 1, the toolholder has a stop face 20. This serves for the rough positioning of the profile tool 1, the position of which on the toolholder is determined by the above-mentioned mating surfaces.

Figure 1:
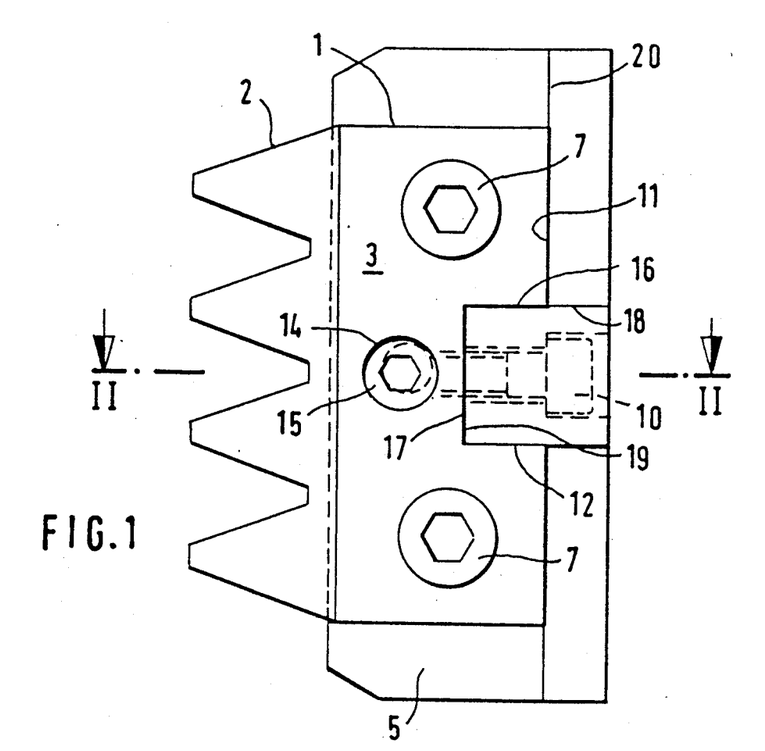
FIG. 1 shows a first example of embodiment in plan view.
Figure 2:
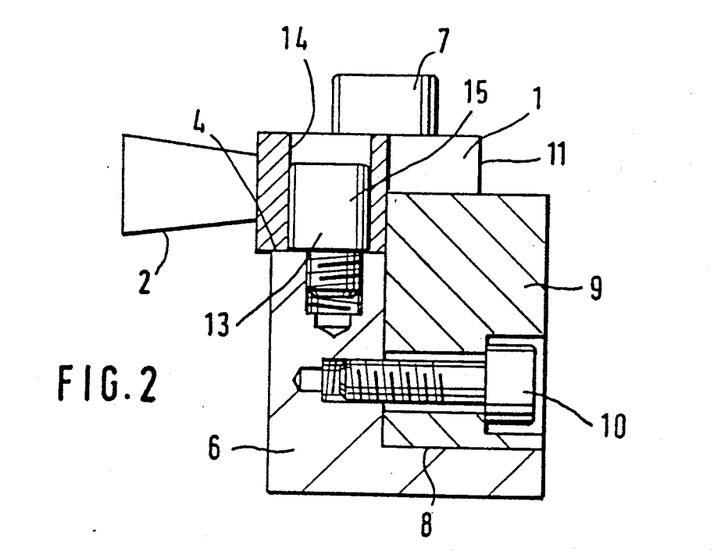
FIG. 2 shows a section on the line II—II in FIG. 1.

In the example of embodiment shown in FIGS. 1 and 2, the toolholder 6 has a rectangular cross-sectional shape, the front edge of which extends to a short distance from the toothed rack 2.

Figure 3:
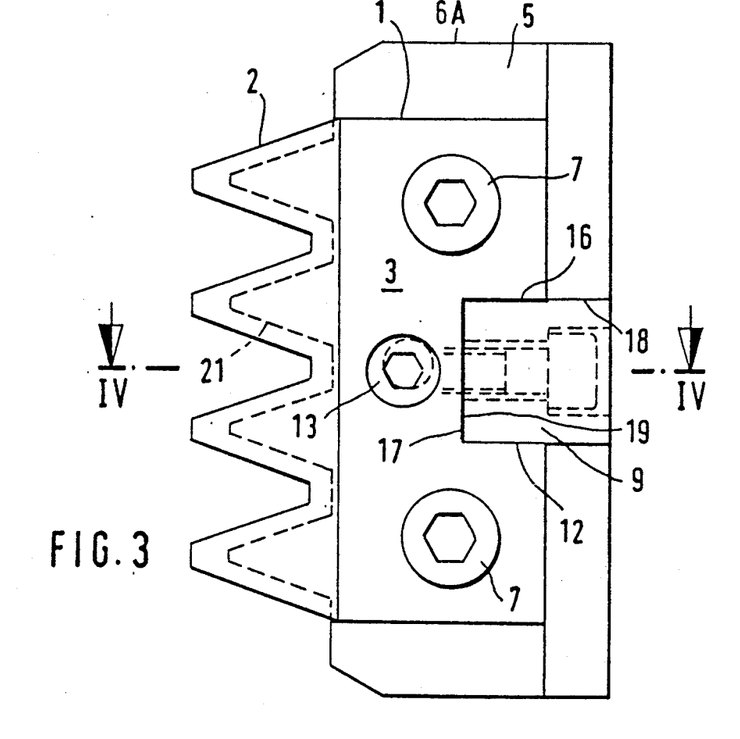
FIG. 3 shows a plan view of a second example of embodiment.
Figure 4:
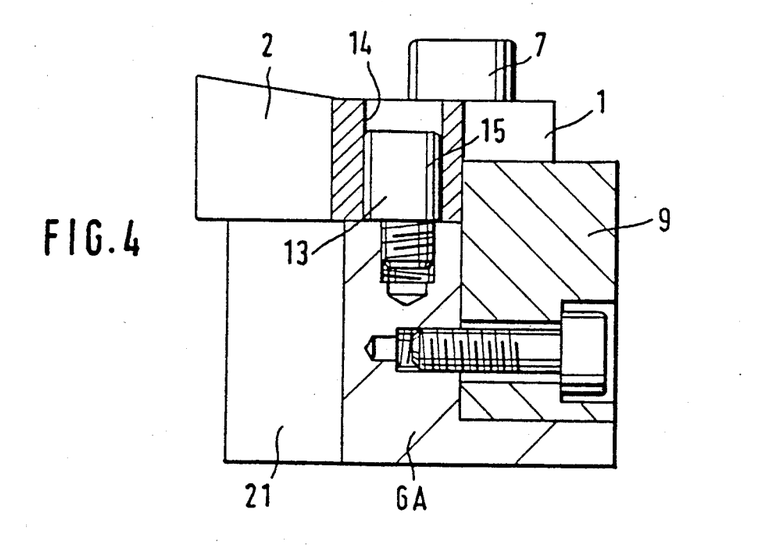
FIG. 4 shows a section on the line IV—IV in FIG. 3.
Figure 5:
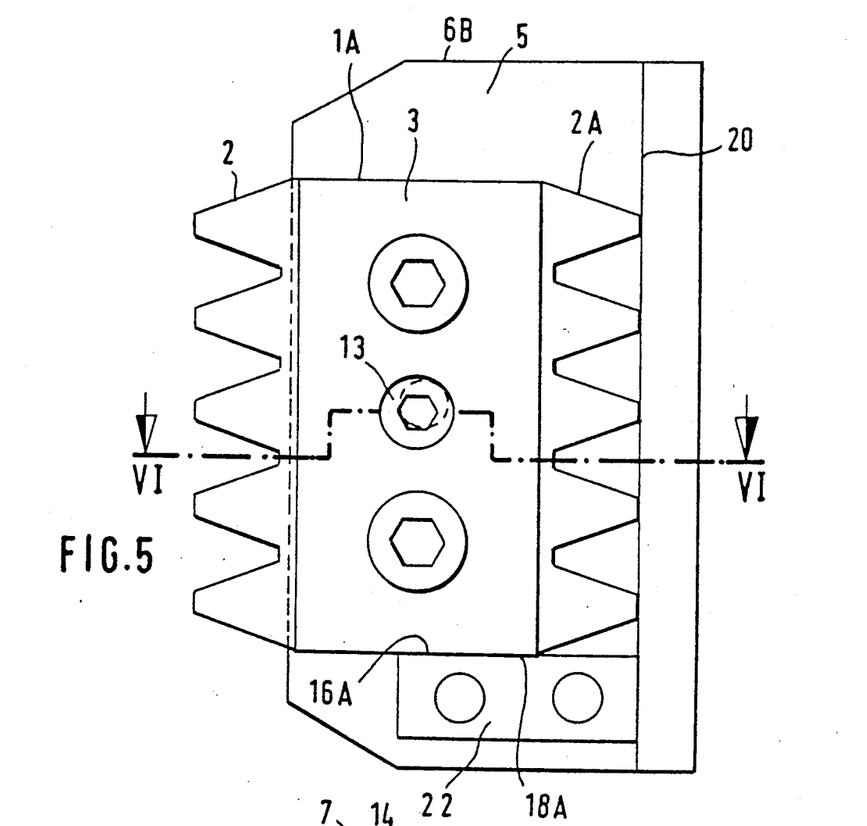
FIG. 5 shows a plan view of a third example of embodiment.
Figure 6:
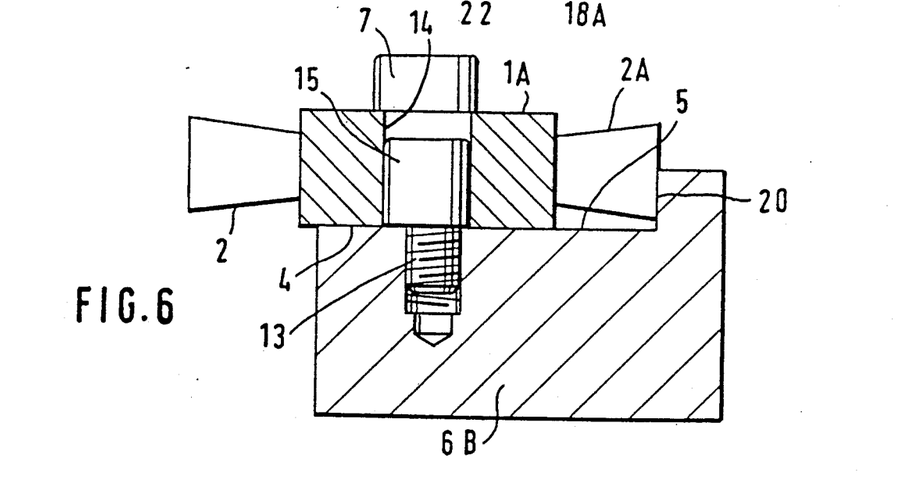
FIG. 6 shows a section on the line VI—VI in FIG. 5.
Figure 7:
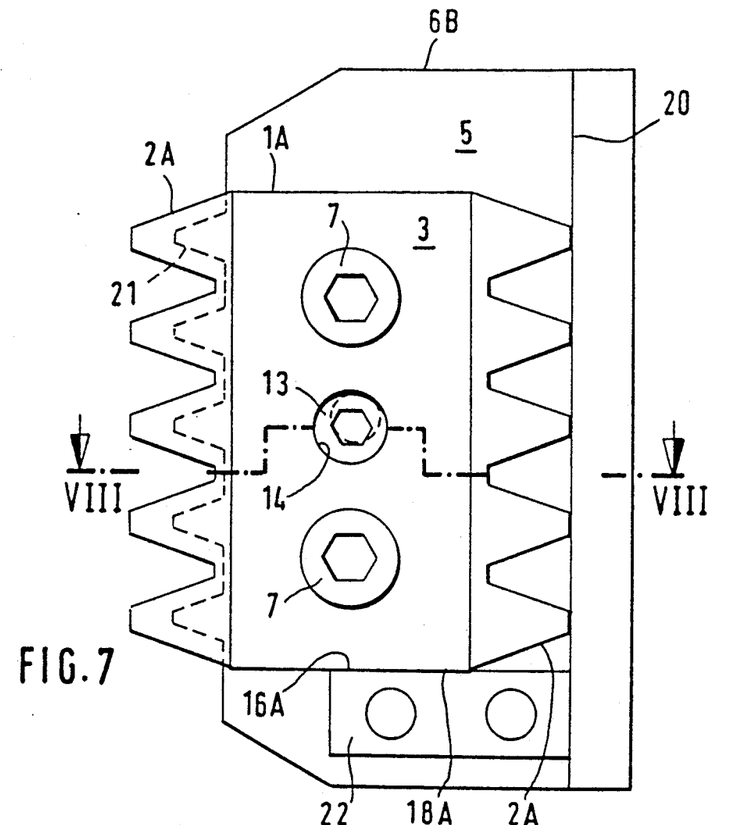
FIG. 7 shows a plan view of a fourth example of embodiment.
Figure 8:
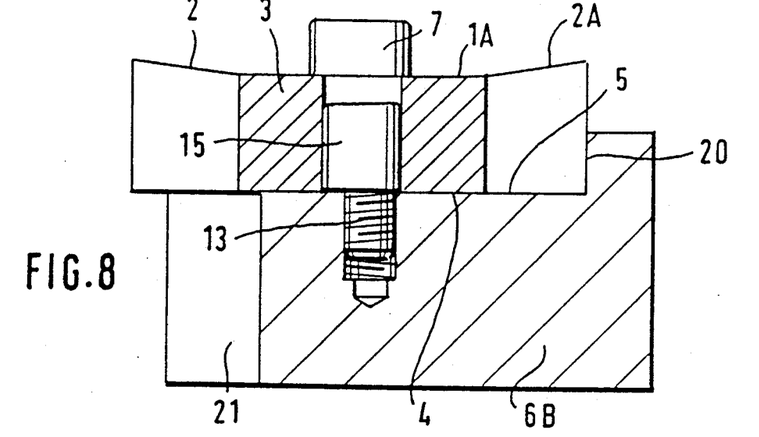
FIG. 8 shows a section on the line VIII—VIII in FIG. 7.

In the example of embodiment shown in FIGS. 3 and 4, the toolholder 6A has the same basic shape as in the previous example of embodiment but it is provided with a supporting profile 21 which extends with constant spacing from the cutting profile of the profile tool 1 so that the toothed rack 2 is supported by this supporting profile 21.

Figure 9:
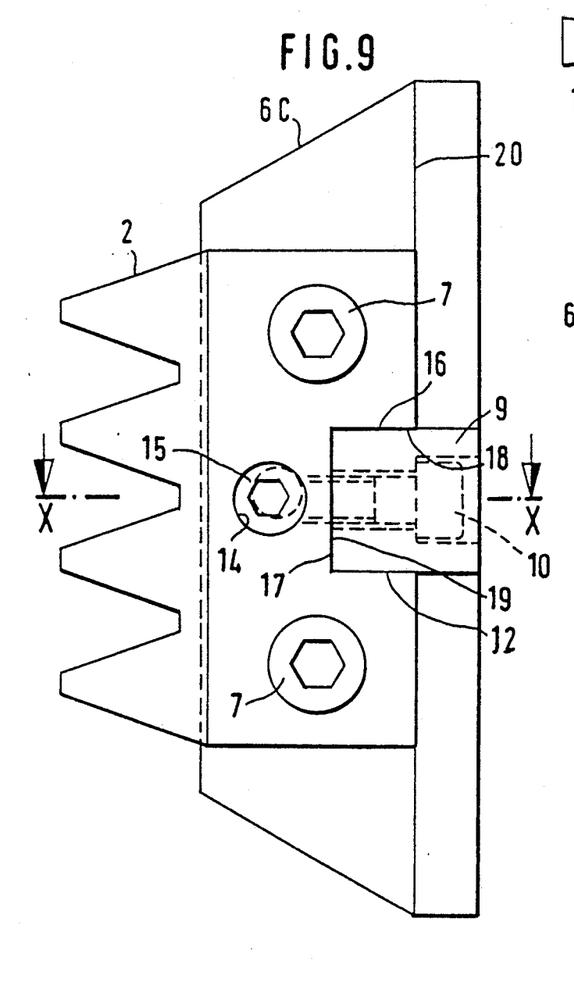
FIG. 9 shows a plan view of a fifth example of embodiment.
Figure 10:
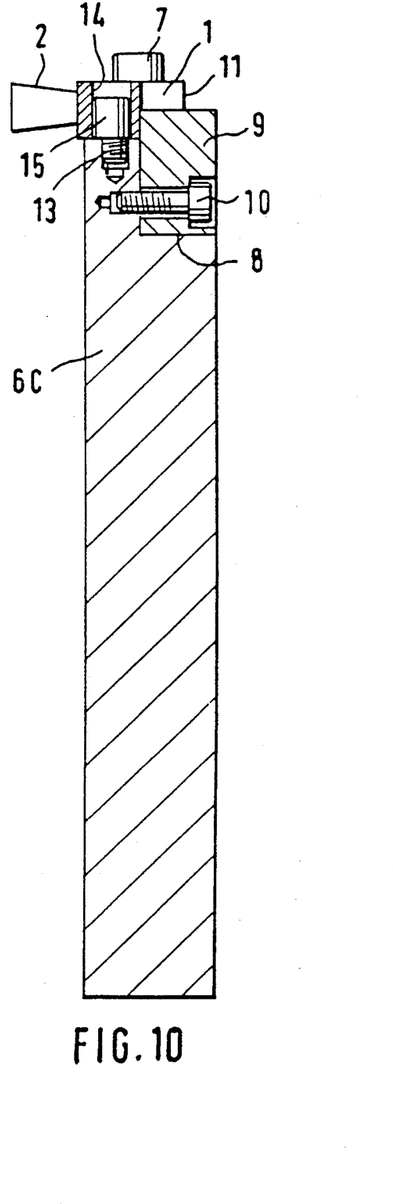
FIG. 10 shows a section on the line X—X in FIG. 9.

The toolholder 6C shown in FIGS. 9 and 10 is extended downwards in comparison with that according to the first and second examples of embodiment.

Figure 11:
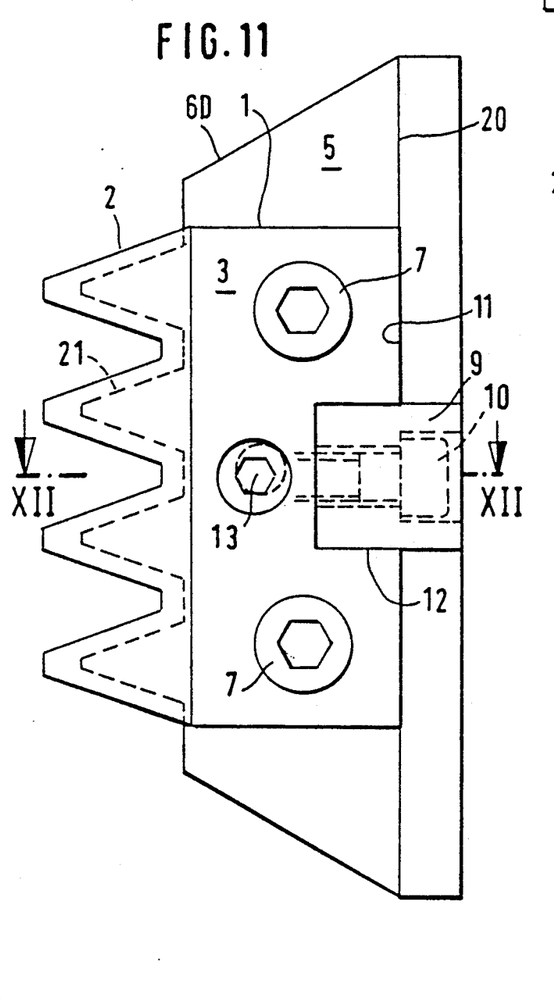
FIG. 11 shows a plan view of a sixth example of embodiment.
Figure 12:
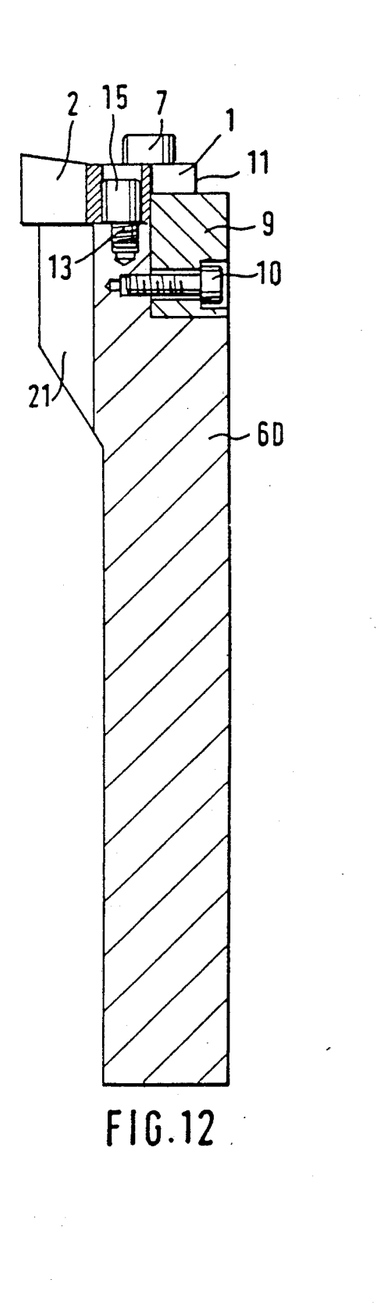
FIG. 12 shows a section on the line XII—XII in FIG. 11.
Figures 13, 14:
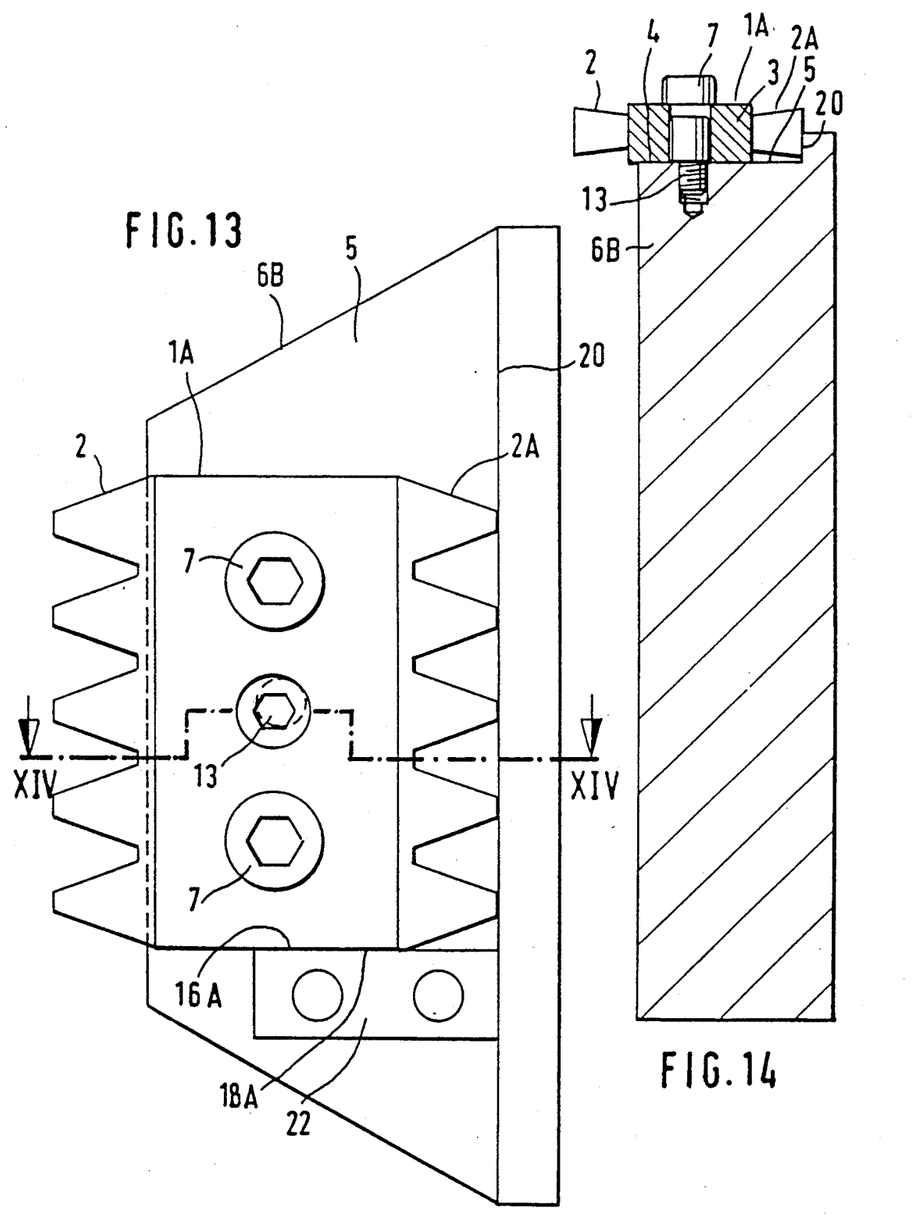
FIG. 13 shows a plan view of a seventh example of embodiment.
FIG. 14 shows a section on the line XIV—XIV in FIG. 13.
Figures 15, 16:
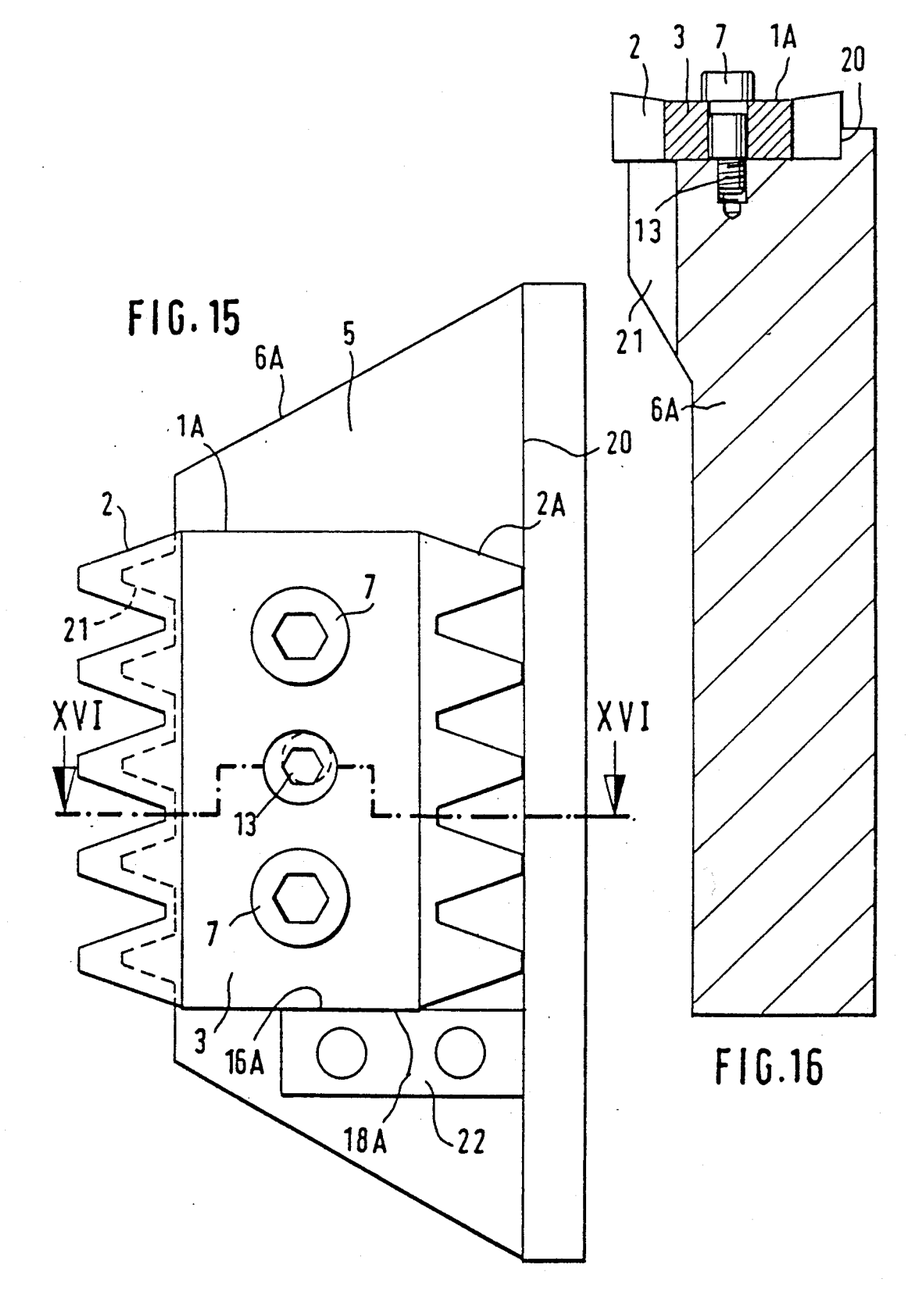
FIG. 15 shows a plan view of an eighth example of embodiment.
FIG. 16 shows a section on the line XVI—XVI in FIG. 15.

The toolholder shown in FIGS. 11 and 12 corresponds to that in FIGS. 9 and 10 but is likewise provided with a supporting profile 21 in accordance with the second example of embodiment.

During the production of the profile tool 1, the teeth of the toothed rack 2 are finished precisely with respect to the mating surfaces 16,17.

In the forms of embodiment shown in FIGS. 5 to 8 and 13 to 16, the profile tool 1A comprises two toothed racks 2,2A extending parallel to one another. When the toothed rack 2 is worn, the profile tool 1A is turned so that the toothed rack 2A now comes into use. In the following examples of embodiment, the toolholder 6 is provided with a fitting strip 22, a separate element which forms a mating surface 18A extending transversely to the toothed racks 2,2A. The transverse edge 16A of the profile tool 1A forms a mating surface 16A pressed against this mating surface 18A by means of the eccentric screw 13. Otherwise, the same applies as was previously described for the other examples of embodiment. This also applies with regard to the stop face 20 in relation to the rear edge 11 which is formed by the toothed rack 2A in the examples of embodiment now being dealt with.

In the production of the toothed racks 2,2A, their alignment is achieved by precise manufacture with respect to the bore 14 and the mating surface 16A.

The profile tool 1 or 1A is coated with a hard material layer to increase its service life.

I claim:

1. A tool device comprising:
   a toolholder having a recess and a mating surface;
   a profile tool mounted on the toolholder and having a first surface provided with a cutting profile, a second surface substantially parallel to said first surface provided with a substantially rectangular recess and a mating surface cooperating with said mating surface of said toolholder;
   locking means for detachably securing said tool to the toolholder;
   first adjusting means extending through the toolholder in the profile tool for pressing the profile tool through its mating surface against said mating surface of the toolholder to determine the position of the tool cutting profile; and
   second adjusting element disposed in the recess of said toolholder and the recess of said profile tool for securing said profile tool in place upon adjustment of said first adjusting means.

2. A tool device according to claim 1, wherein the first adjusting means comprises (1) a screw element having a threaded portion and an eccentric portion, (2) a screw thread being formed in the toolholder for engaging said threaded portion, and (3) an aperture in said tool for engaging the eccentric whereby the screw element presses said mating surfaces into engagement.

3. A tool device according to claim 2, wherein the profile tool is displaceable relative to the toolholder at least parallel to the mating surfaces.

4. A tool device according to claim 2, wherein the eccentric screw element acts with its eccentric portion centrally on the profile tool.

5. A tool device according to claim 1, wherein the locking means for securing the profile tool on the toolholder comprises at least one locking screw, said screw having a head that exerts a torque on said tool when the screw is tightened and further having a thread of which is so handed that, during tightening, said screw head, exerts a torque acting in the direction of the mating surfaces.

6. A tool device according to claim 1, wherein the mating surfaces are plane surfaces.

7. A tool device according to claim 6, wherein said mating surface of the toolholder is formed by a separate element secured to the toolholder.

8. A tool device according to claim 7, wherein the profile tool has a transverse edge forming said mating surface of said tool and said separate element provides a cooperating mating surface for said surface of the tool.

9. A tool device according to claim 8, wherein a guide ledge on the toolholder extends transversely to said separate element, the profile tool having a rear edge extending along said guide ledge.

10. A tool device according to claim 9, wherein said rear edge presents a further cutting profile of the profile tool.

11. A tool device according to claim 1, wherein a layer of hard material coats the profile tool.

12. A tool device according to claim 1, wherein the toolholder comprises a supporting profile which extends at a substantially constant distance from the cutting profile of the profile tool and supports said tool profile.

* * * * *